United States Patent [19]

Kuchenbecker et al.

[11] Patent Number: 5,761,358
[45] Date of Patent: Jun. 2, 1998

[54] OPTICAL PIN-AND-SOCKET CONNECTOR AND PROCESS FOR MANUFACTURING OPTICAL PIN-AND-SOCKET CONNECTORS

[75] Inventors: Thomas Kuchenbecker; Norbert Weiss, both of Berlin, Germany

[73] Assignee: Siemens Aktiengesellschaft, Munich, Germany

[21] Appl. No.: 591,665

[22] PCT Filed: Jul. 29, 1994

[86] PCT No.: PCT/DE94/00905

§ 371 Date: May 24, 1996

§ 102(e) Date: May 24, 1996

[87] PCT Pub. No.: WO95/04949

PCT Pub. Date: Feb. 16, 1995

[30] Foreign Application Priority Data

Aug. 11, 1993 [DE] Germany .......... 43 27 525.7

[51] Int. Cl.[6] .......... G02B 6/38
[52] U.S. Cl. .......... 385/56; 385/60; 385/59
[58] Field of Search .......... 385/56, 58, 59, 385/60, 76, 77, 78, 81

[56] References Cited

U.S. PATENT DOCUMENTS

| | | | |
|---|---|---|---|
| 4,936,662 | 6/1990 | Griffin | 350/96.2 |
| 5,119,455 | 6/1992 | Jennings | 385/81 |
| 5,157,749 | 10/1992 | Briggs et al. | 385/56 X |

FOREIGN PATENT DOCUMENTS

| | | |
|---|---|---|
| 0 375 168 | 12/1988 | European Pat. Off. |
| 0 327 267 | 8/1989 | European Pat. Off. |
| 0 339 876 | 11/1989 | European Pat. Off. |
| 88/05925 | 8/1988 | WIPO |

*Primary Examiner*—Phan T. H. Palmer
*Attorney, Agent, or Firm*—Kenyon & Kenyon

[57] ABSTRACT

Coupling end-pieces (20, 21) with axial bores (22, 23) are mounted in a separate front part (25). A cable end (3) with two optical fibers (8,9) is fixed in a main part (1). The ends (10, 11) of the fibers project at the front part side and extend in axially parallel fashion at a distance (29) from the axial bores (22, 23). The front part (25) can slide perpendicularly to the ends (10, 11) of the fibers in order to allow alignment of the axial bores (22, 23) with the ends (10, 11) of the fibers.

5 Claims, 2 Drawing Sheets

OPTICAL PIN-AND-SOCKET CONNECTOR AND PROCESS FOR MANUFACTURING OPTICAL PIN-AND-SOCKET CONNECTORS

FIELD OF THE INVENTION

The present invention concerns an optical pin-and-socket connector with a housing with a main part in which a cable end containing two optical fibers is fixed, and with a front region in which two coupling end-pieces, each with an axial bore to receive one fiber end each, are mounted.

BACKGROUND OF THE INVENTION

In known (EP-A1-0 375 168 and WO 88/05925) optical pin-and-socket connectors of the aforesaid kind, a cable end that contains two optical fibers and a strain relief enters a pin-and-socket connector housing. An end section of the cable end, from which the cable sheath has been stripped, is fastened in the rear main part of the housing with strain relief. The loose fibers extend, in unguided fashion, to a front region of the housing, in which two coupling end-pieces are mounted. The coupling end-pieces have axial bores to receive the fiber ends.

In the manufacture of the known pin-and-socket connector, in an assembly fixture the fiber ends are first introduced into the respective axial bore of the coupling end-piece and immobilized (e.g. by adhesive bonding) therein. Insertion and immobilization of the fiber ends can be accomplished, for example, according to the method made known by EP-A2-0 327 267. Then the cable end, which is already equipped with the coupling end-pieces (prefabricated), is removed from the fixture and inserted into the pin-and-socket connector housing.

Manufacturing the known pin-and-socket connector is relatively complex, since the fiber ends must first be brought into axial alignment with the axial bores of the coupling end-pieces in a separate fixture and while avoiding any bending, torsional, and/or shear stresses. The cable end must be held in the fixture until immobilization (curing of an epoxy resin used for adhesive bonding) is complete; during this period the fixture is unusable. Manufacture is additionally complicated by the fact that the fiber ends with the coupling end-pieces must be carefully removed from the fixture while avoiding stresses on the fibers, and inserted into the housing of the pin-and-socket connector.

OBJECTS AND SUMMARY OF THE INVENTION

It is therefore the object of the invention to create an optical pin-and-socket connector that can be manufactured easily and with an uncomplicated fixture, with the fibers being protected as completely as possible from stresses and damage during manufacture.

According to the invention this object is achieved, in an optical pin-and-socket connector of the aforesaid kind, in that the front region is configured as a separate front part; that the optical fibers are arranged in the main part in such a way that the fiber ends project at the front part side and extend in axially parallel fashion at a distance corresponding to the distance between the axial bores; that the front part can be slid and positioned, perpendicular to the longitudinal axes of the fiber ends and relative to the main part, in such a way that the axial bores align with the longitudinal axes; and that in the aligned position, the front part can be moved toward the main part in the direction of the longitudinal axes, and can be immobilized onto the main part.

An essential advantage of the pin-and-socket connector is that in the manufacture of the pin-and-socket connector, two essential components of the pin-and-socket connector housing (product housing)—namely the main part and the front part—function almost as one. This eliminates the transfer, required in the case of the aforesaid prior art, of the prefabricated cable end into the pin-and-socket connector housing. Immobilizing the front part onto the main part already produces a pin-and-socket connector preassembled to the extent that the sensitive optical fibers are largely protected against external stresses.

An embodiment of the pin-and-socket connector that is preferred in terms of production engineering provides for the front part to be connected to the main part by means of a common housing cover. Preferably the housing cover can be connected by means of snap-fit arms to the front part and the main part; a connection of this kind is not only simple to manufacture, but can also be easily undone if necessary.

According to the invention, a development of the method for manufacturing an optical pin-and-socket connector known from EP-A1-0 375 168, in which a cable end with two optical fibers is fixed in a main part of a housing, in which two coupling end-pieces with one axial bore each are mounted in a front region of the housing, and in which one fiber end is inserted into each axial bore, consists in the fact that the front region is configured as a separate front part; that the optical fibers are arranged in the main part in such a way that the fiber ends project at the front part side and extend in axially parallel fashion at a distance corresponding to the distance between the axial bores; that the front part is slid and positioned, perpendicular to the longitudinal axes and relative to the main part, in such a way that the axial bores align with the longitudinal axes; and that the front part, in the aligned position, is moved toward the main part in the direction of the longitudinal axes and immobilized onto the main part. The method according to the invention offers the advantage that the fiber ends can be inserted into the axial bores without bending, torsional, and/or shear stresses, with no need for an additional fixture.

An advantageous development of the method according to the invention consists in the fact that the optical fibers are immobilized in the main part, in recesses at the front-part end, by means of spring forces. The fiber end is thus immobilized in particularly simple fashion and without additional adhesive bonding; preferably a curved plastic spring in the main part can generate the spring forces. After immobilization of the front part, the plastic spring can be removed if necessary.

BRIEF DESCRIPTION OF THE DRAWINGS

An exemplary embodiment of the invention will be explained in more detail below with reference to drawings, in which.

DETAILED DESCRIPTION

Figure 1:
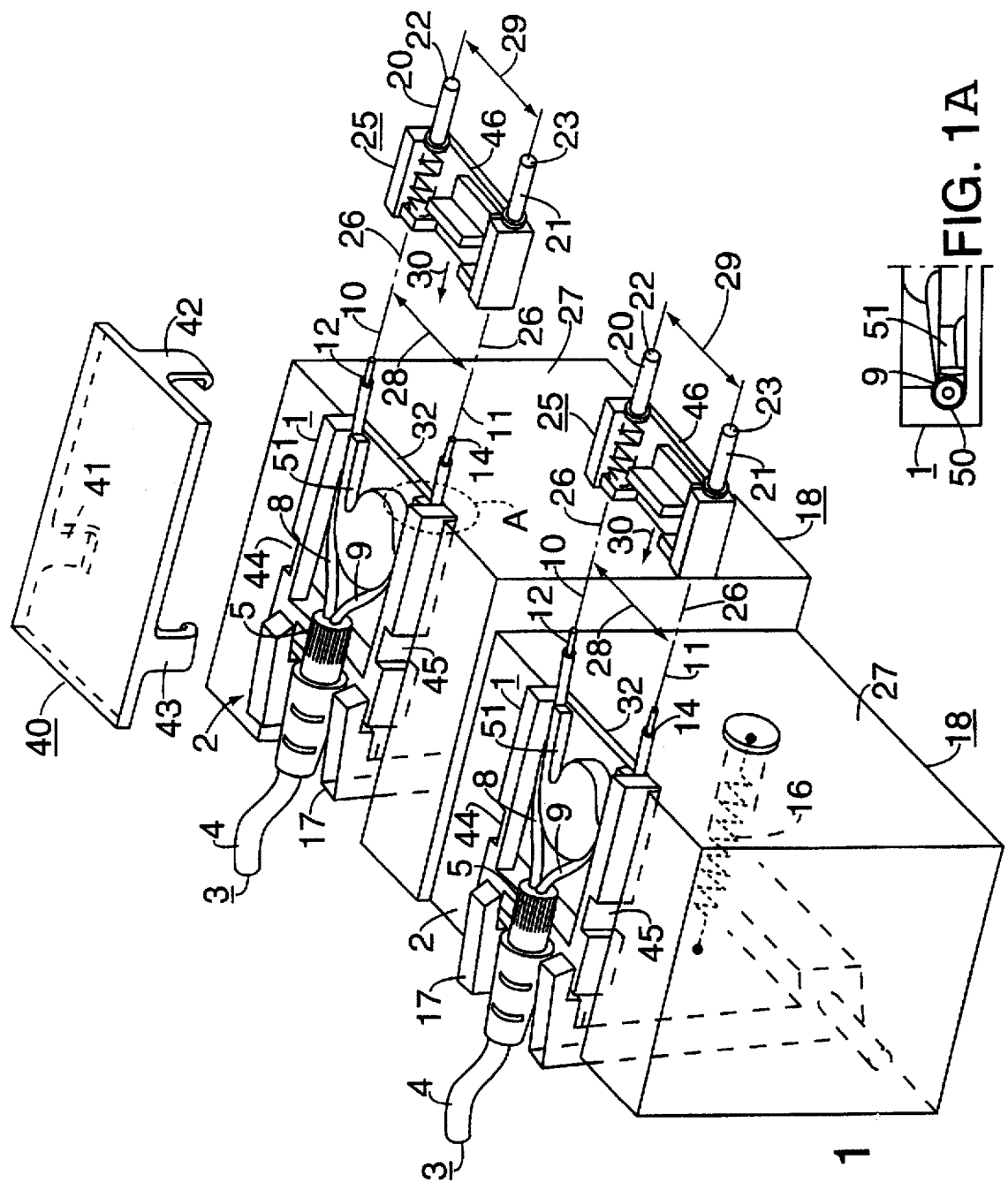
FIG. 1 shows main components of a pin-and-socket connector according to the invention during assembly.

FIG. 1 shows the simultaneous assembly of two pin-and-socket connectors, each with a main part 1, into whose rear region 2 enters a cable end 3 that contains in its cable sheath 4 (indicated only schematically) strain relief fibers 5 and two optical fibers 8, 9 (duplex pin-and-socket connector). Fibers 8, 9 have a protective sheathing 12, 14 at least partly stripped from them in the region of their fiber ends 10, 11. A retaining ratchet 17 preloaded by a spring 16 immobilizes main part 1 during assembly on an assembly block 18.

Coupling end-pieces 20, 21, each with an axial bore 22, 23, are mounted in axially elastic fashion in a separate front part 25. Front part 25 can slide relative to main part 1 in a plane 27 substantially perpendicular to longitudinal axis 26 of fiber ends 10, 11. Fibers 8, 9 are arranged in main part 1, at the end facing front part 25 (at the front-part end), in such a way that the fiber ends 10, 11 project at the front part side and extend in axially parallel fashion. Distance 28 between their parallel longitudinal axes 26 corresponds substantially to distance 29 between axial bores 22, 23 of coupling end-pieces 20, 21 in front part 25.

To assemble the pin-and-socket connector according to the invention, front part 25 is slid in plane 27 into a position such that axial bores 22, 23 are aligned with the respective longitudinal axis 26 and with fiber ends 10, 11. In the aligned position, front part 25 is then moved toward main part 1 in direction 30 of longitudinal axis 26, such that fiber ends 10,11 penetrate into axial bores 22, 23. In order to immobilize the fiber ends in the axial bores, the axial bore in the region of the fiber ends can be previously equipped with curable epoxy resin. After being inserted into axial bores 22, 23, fiber ends 10, 11 are immobilized there by curing of the epoxy resin. The immobilized fiber ends project slightly beyond the end surfaces of coupling end-pieces 20, 21 and receive by means of subsequently processing (polishing) the optical quality sufficient for good optical coupling. Main part 1 and front part 25 can be connected at a connected plane 32, for example by adhesive bonding or welding. The connection can be effected additionally or exclusively by means of a common cover 40, which snaps into place with elastic snap-fit arms 41, 42, 43 at locking positions 44, 45, 46 provided for them.

As detail A in FIG. 1 shows, the fibers (only fiber 9 is shown) are preferably guided in recesses 50 of main housing 1 and immobilized in recess 50 by means of a plastic spring 51 that can later be removed.

Figure 2:
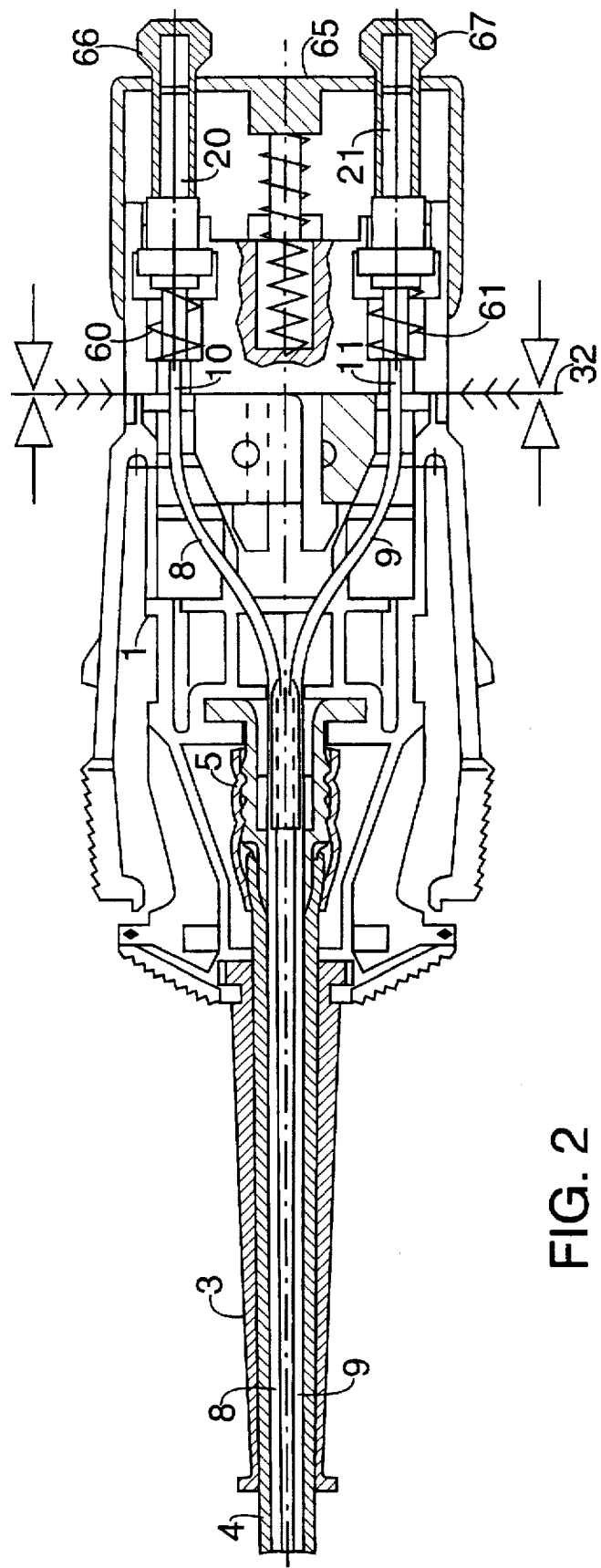
FIG. 2 shows an assembled pin-and-socket connector partly sectioned.

Shown in FIG. 2 is cable end 3, entering the rear of main part 1, with fibers 8, 9, strain-relief fibers 5 fastened by crimping, and cable sheath 4. Fiber ends 10, 11 are inserted in the manner described above into coupling end-pieces 20, 21, which are axially spring-preloaded by springs 60, 61 and protected by a spring-loaded protective cap 65 and protective pins 66, 67.

In the pin-and-socket connector according to the invention, front part 25, forming the one part of the overall housing, serves almost as an assembly fixture for receiving and aligning coupling end-pieces 20, 21. Because axial alignment of axial bores 22, 23 with longitudinal axes 26 has previously been assured, fiber ends 10, 11 can be introduced without torsional, radial, or shear forces. Positioning of front part 25 can also be accomplished by means of a micromanipulator (not depicted). To simplify alignment between fiber ends 10, 11 and axial bores 22, 23, fibers 8, 9 can have light applied to them at their other ends, and the emergence of light at fiber ends 10, 11 can be observed through a microscope if appropriate.

We claim:

1. An optical pin-and-socket connector having a housing comprising:

a main part in which a cable end having two optical fibers is fixed; and a front region having two coupling end-pieces mounted therein, each coupling end-piece having an axial bore adapted to receive an end of one of said fibers, wherein the front region is configured as a separate front part of the housing, and wherein the main part includes guide means for arranging the optical fibers in the main part such that the ends of said fibers project at a front part side of said main part, and the ends of the fibers each extend along a respective longitudinal axis in an axially parallel fashion at a distance from each other corresponding to the distance between the axial bores, wherein the front part is slid, prior to immobilization on the main part, in a direction perpendicular to the longitudinal axes of the fiber ends and positioned relative to the main part in an aligned position wherein the axial bores are aligned with the longitudinal axes, and when in the aligned position, the front part is moved, prior to immobilization on the main part, toward the main part in the direction of the longitudinal axes and is immobilized onto the main part.

2. The pin-and-socket connector of claim 1, wherein the front part is connected to the main part by means of a common housing cover.

3. The pin-and-socket connector of claim 2, wherein the housing cover is connected by means of snap-fit arms to the front part and to the main part.

4. A method of manufacturing an optical pin-and-socket connector having a housing comprising a main part in which a cable end having two optical fibers is fixed, and a front region having two coupling end-pieces mounted therein, each coupling end-piece having an axial bore adapted to receive an end of one of said fibers, wherein the front region is configured as a separate front part of the housing, comprising the steps of:

arranging the optical fibers in the main part such that the ends of said fibers project at a front part side of said main part, and the ends of the fibers each extend along a respective longitudinal axis in an axially parallel fashion at a distance from each other corresponding to the distance between the axial bores;

sliding the front part in a direction perpendicular to the longitudinal axes of the fiber ends to position the front part relative to the main part in an aligned position wherein the axial bores are aligned with the longitudinal axes;

moving the front part toward the main part in the direction of the longitudinal axes such that the fiber ends penetrate the axial bores; and immobilizing the front part onto the main part.

5. The method of claim 4, further comprising immobilizing the optical fibers in recesses in the front part side of the main part using spring force.

* * * * *